May 22, 1962 R. A. CURTIS ET AL 3,035,428
DRY CLEANER APPARATUS
Filed Aug. 10, 1959 11 Sheets-Sheet 4

INVENTOR.
JAMES D. ROBBINS
BY RICHARD A. CURTIS

ATTORNEYS

May 22, 1962 R. A. CURTIS ET AL 3,035,428
DRY CLEANER APPARATUS
Filed Aug. 10, 1959 11 Sheets-Sheet 6

INVENTOR.
JAMES D. ROBBINS
BY RICHARD A. CURTIS

ATTORNEYS

Fig. 16

May 22, 1962 R. A. CURTIS ET AL 3,035,428
DRY CLEANER APPARATUS
Filed Aug. 10, 1959 11 Sheets-Sheet 9

INVENTOR.
JAMES D. ROBBINS
BY RICHARD A. CURTIS

ATTORNEYS

United States Patent Office 3,035,428
Patented May 22, 1962

3,035,428
DRY CLEANER APPARATUS
Richard A. Curtis, 524 Vergennes, Lowell, Mich., and James D. Robbins, 113 Barber Court, Spring Lake, Mich.
Filed Aug. 10, 1959, Ser. No. 832,745
4 Claims. (Cl. 68—18)

This invention relates to a dry cleaning apparatus and more particularly to a system for circulating the dry cleaning solvent. More particularly, this invention relates to a circulating system for a home dry cleaning apparatus.

Various types of circulating systems for dry cleaning apparatus have been developed and suggested. These systems, however, primarily relate to apparatus utilized by trained operators such as in commercial dry cleaning establishments. To our knowledge, no dry cleaning apparatus has been devised which requires very little attention and is thereby adapted for use in the ordinary home. An object of this invention is to provide such a type dry cleaning apparatus having a novel system for cleaning the dry cleaning solvent so that very little attention is required of the apparatus.

Another object of this invention is to provide a dry cleaning solvent circulating system which accomplishes a better job of dry cleaning than has heretofore been possible.

Still another object of this invention is to provide such a system which is completely closed thereby minimizing leakage of vapors from the solvent.

A further object of this invention is to provide a system by which the solvent is recirculated through the washing tank at a constant rate regardless of the length of time during which the filter has been used without reconditioning.

Another object of this invention is to provide such a system in which the solvent is maintained cleaner as it is circulated through the washing tank.

Still another object of this invention is to provide such a system which requires less attention and service than other dry cleaning apparatus of its type.

These and other objects of our invention will become obvious to those skilled in the art of dry cleaning upon reading the following specification in conjunction with the accompanying drawings, wherein.

Figure 1:
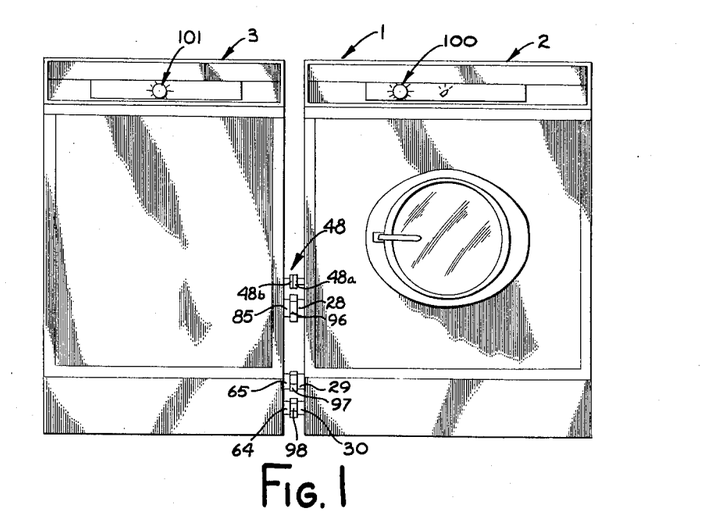
FIG. 1 is a front elevational view of a combination laundry and dry cleaning apparatus including a dryer-washer combination unit and a dry cleaner attachment unit.
Figure 2:
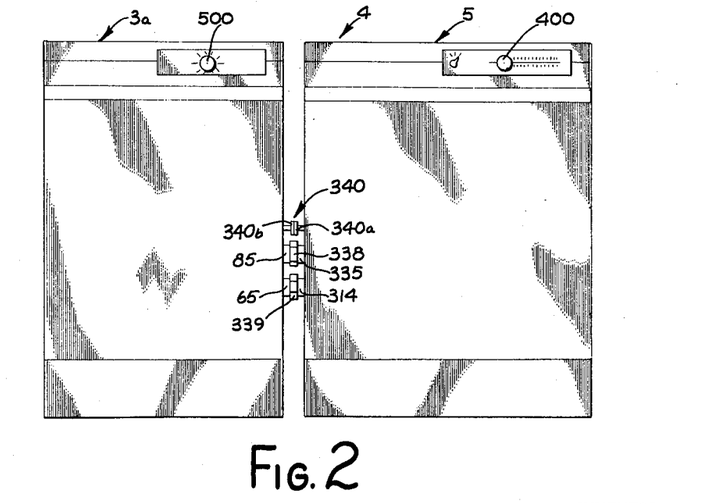
FIG. 2 is a front elevational view of a combination laundry and dry cleaning apparatus including an automatic washer and dry cleaner attachment unit.

The illustrated combination dry cleaner and laundry apparatus comprises two different combinations. FIG. 1 discloses a combination dry cleaning-washer-dryer apparatus 1 including a separate combination washer-dryer unit 2 and the dry cleaner attachment unit 3. FIG. 2 discloses a combination dry cleaning-washer apparatus 4 including the automatic washer 5 and the dryer cleaner attachment unit 3a. It is important to note that both the combination washer-dryer 2 and automatic washer 5 are each separate units encased in separate housings from the dry cleaner attachment units 3 and 3a which are substantially identical. The only difference in these units 3 and 3a is in the timer control mechanism and drain conduit arrangement as will be described hereinafter. In order to clearly describe this invention, the combination dry cleaning-washer-dryer apparatus 1 of FIG. 1 will first be described and then structure of the dry cleaner attachment unit will be related to the combination dry cleaner-washer apparatus 4 of FIG. 2.

The combination washer-dryer unit 2 is a conventional but modified washer-dryer unit like that sold by the Norge Corporation. The unit comprises a stationary tank 6 adapted to receive and hold liquid. A basket 7, having the fins 8 for tumbling the clothing, is rotatably mounted on a horizontal axis within the tank 6.

Figure 4:
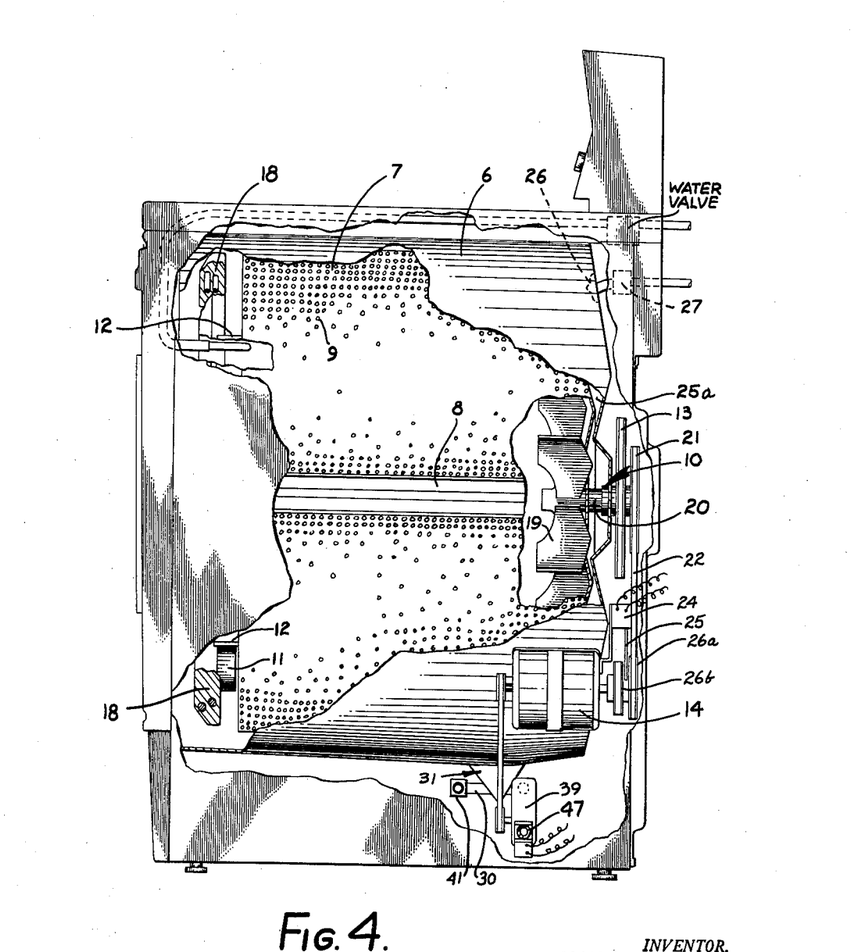
FIG. 4 is a side elevational, cutaway view of the combination washer-dryer combination unit shown in FIG. 3.

This basket is entirely perforated with openings or holes 9 (FIG. 4) and is rotatably mounted on its axis by a bearing assembly 10 located at the rear of the tank 6 and by a plurality of rollers 11 on which the cylinder track 12 on the front end of the basket rides.

Figure 5:
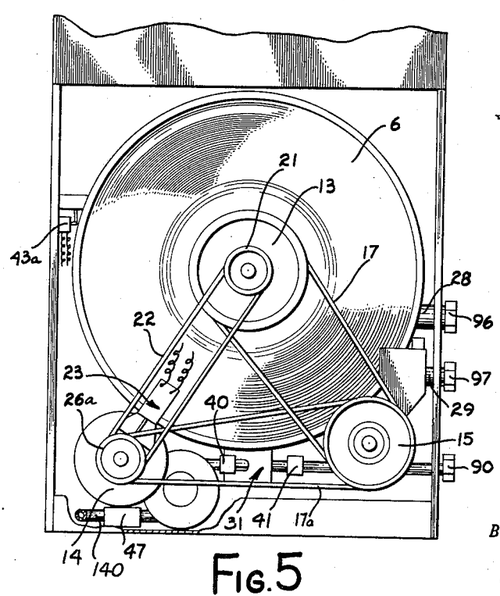
FIG. 5 is a schematic view of the back of the combination washer-dryer unit of FIG. 3.

The basket 7 is driven by a pulley 13 operatively connected to the motor 14 by pulley 26b and belt 17a through the two-speed transmission mechanism or assembly 15 (FIG. 5), which mechanism is controlled by the solenoid 16 (FIG. 3) in a manner well-known to those skilled in the art. When solenoid 16 is de-energized the basket is driven at tumbling speed; when energized, basket 7 is driven at spin or extract speed. The exact construction of the transmission mechanism 15 and the solenoid 16 is not described because it is believed that anyone skilled in the art would use any number of different types of transmissions to obtain a two-speed drive of the basket 7. The pulley 13 is driven by the transmission assembly 15 through the belt 17 passing around the pulley of the transmission assembly 15 and also the pulley 13.

Figure 6:
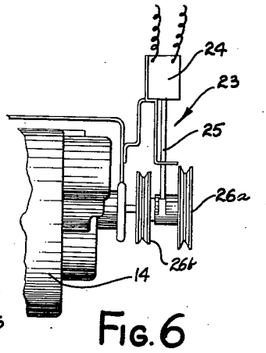
FIG. 6 is a fragmentary enlarged view of a motor clutch and blower clutch assembly for the combination washer-dryer unit of FIGS. 3, 4 and 5.

Since the unit 2 is a combination washer-dryer a heater and fan means is provided to dry the clothes. The heater element 18 (FIG. 4) consists of two rod type elements in an aluminum casing which is secured to the tank head. The fan or blower 19 is located at the rear of the basket 7 and is secured to the rotatable shaft 20 extending rearwardly and connected to the pulley 21 which in turn is driven by the motor 14 through the belt 22. A fan or blower clutch 23 (FIGS. 5 and 6) is provided for controlling the actuation of the fan or blower 19. This clutch 23 includes a solenoid 24 having an armature 25 normally preventing rotation of the pulley 26a around which the fan or blower belt 22 extends. When solenoid 24 is energized the armature 25 is withdrawn causing the motor 14 to rotate the pulley 26a and as a result operate the fan or blower 19. In this particular modified combination washer-dryer a passageway 25a for condenser water is provided at the rear of the tank. This condenser water passageway carries cold water, flowing from condenser T 26 during the drying period, and the fan is arranged to draw the moist air from inside the tank past this passageway where the water in the air is condensed and runs downwardly into the drain valve assembly 31. The air is then forced upwardly and around past the heater element 18. In the line leading to the condenser T is provided a solenoid actuated valve 27 which controls the flow of water through the condenser water passageway 25a.

So far we have described that which is conventional on the Norge combination washer-dryer. In accordance with this invention, the combination washer-dryer is slightly modified to adapt it for conversion into a combination dry-cleaner-washer-dryer unit. The modifications made in this conventional unit will now be described.

The combination washer-dryer unit 2 is modified to provide a solvent overflow conduit 28, the solvent inlet conduit 29 and a solvent drain conduit 30 which leads from the water and solvent valve assembly 31 mounted in the bottom of the tank 6 in place of the conventional sediment trap.

Figure 10:
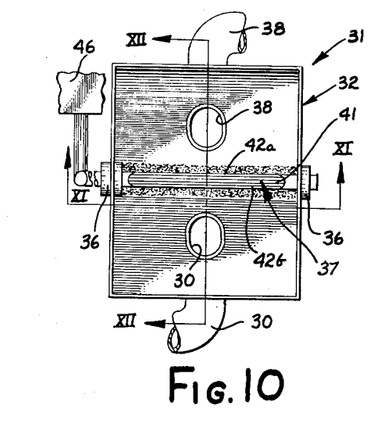
FIG. 10 is a plan view of the flipper valve located at the bottom of the tank of the combination washer-dryer unit of FIGS. 1, 3 and 4 as taken along the plane X—X.
Figure 11:
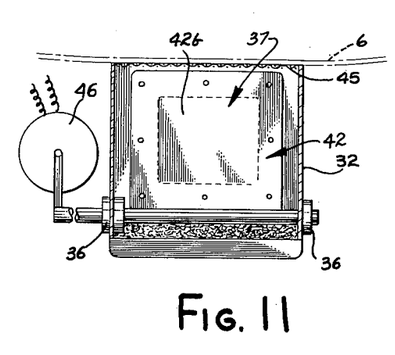
FIG. 11 is a cross sectional view taken along the plane XI—XI of FIG. 10.
Figure 12:
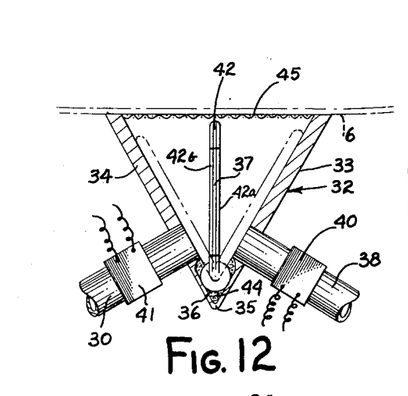
FIG. 12 is a cross sectional view of the flipper valve taken along the plane XII—XII of FIG. 10.

The water and solvent drain valve assembly 31, shown in more detail in FIGS. 10, 11 and 12 comprises a triangular shaped housing 32 attached to the bottom of the tank 6 over the opening leading to the conventional sediment trap. This housing 32 has two sides or walls 33 and 34 converging downwardly to the vertex 35 where there is positioned a journal 36 for a flipper valve element 37. Leading from the side 33 is the water drain conduit 38 and from the side 34 is the solvent drain conduit 30. Each of these conduits 38 and 30 have a pinch valve 40 and 41, respectively, of a conventional type for preventing the water or solvent from backing up into the housing 32. The flipper valve element 37 is positioned for actuation into either of two positions. In one position it covers the opening over the water drain conduit 138 and in the other position it covers the opening over the solvent drain conduit 30. The flipper valve element 37 is constructed of a frame 42 having the flexible covering 42a and 42b on each side. The flipper valve element 37 is arranged so that the minimum amount of water or solvent remains in the valve assembly when the respective conduit is closed. For example, when the flipper valve element 37 is in the position to the left as shown in FIG. 12, only a very small amount of solvent remains in the housing 32 and likewise when the flipper element is to the right only a very small amount of water is permitted to remain in the housing. This is important because we have found the amount of water that can be mixed with the solvent in dry cleaning a load of clothing cannot exceed 3½ ounces. To limit this amount of remaining water we provide a lead packing 44 in the vertex 35 of the V-shaped housing 32 to eliminate the accumulation of any water in the vertex. Further, the flipper valve element 37 abuts against the walls 33 and 34 causing any water remaining therebetween to be squeezed downwardly and outwardly through the conduit 38. In order to prevent any nails or pins from entering the housing 32 and preventing the complete closing of the flipper valve element 37, a screen 45 is provided over the opening between the tank and the housing 32.

The flipper valve element 37 is controlled by the solenoid 46. The water drain 38 leads to the water pump 39 which is constantly driven by the motor 14. Leading from the pump 39 is the water drain conduit 140 (FIGS. 3 and 4) having another pinch valve 47 which prevents back up of the water through the pump and into the housing 32. It is important to note that the pump 39 is connected in the line such that the conduit 38 is located at a higher level than the outlet leading to the conduit 140. This is also to prevent the water from backing up through the pump into the housing 32.

A draft valve 43 is provided in the tank 6. This valve is actuated by the solenoid 43a and is provided for the purpose of facilitating the exhaust of fumes from tank 6 as will be described.

Another change made in the conventional combination washer-dryer is the interconnection in the electrical system of the electrical connector 48 which will be described in more detail hereinafter.

So far we have described the major changes or modifications made in a conventional combination washer-dryer unit. Additional minor changes are required including replacing the door gasket with any solvent resistant material, the solvent being a perchloro ethylene. Further, the pulley of the transmission assembly 15 is increased in size to increase extraction speed to at least 250 r.p.m. The water level safety switch diaphragm (not shown) is also changed to a solvent resistant material, and other minor changes coming within the purview of any mechanic skilled in the art can also be made.

It should be emphasized that the above changes made in a conventional Norge combination washer-dryer machine do not affect the normal operation of the machine for use in laundering clothing. In fact, this machine can be used alone by merely plugging the openings to conduits 28 and 29 to prevent the water from flowing out of the tank 6. It is intended in accordance with the basic concept of this invention that this machine can be sold as a separate unit to be used as a combination washer-dryer. The dry cleaning attachment unit 3, to be now described, can then be sold at a later date and by merely connecting the attachment to the modified combination washer-dryer machine, a combination dry cleaner-washer-dryer apparatus is obtained.

*Dry Cleaner Attachment Unit*

The dry cleaner attachment unit 3 is a separate unit encased in a separate housing or casing 49. This unit includes the frame 50 supporting the tank assembly 51, the filter unit 52, the pump motor 53, the exhaust fan 54, and the various conduits which in conjunction with the components just listed and the combination washer-dryer unit 2 constitute the dry cleaning system.

The tank assembly 51 is mounted on the horizontal cross support member 55 at the bottom of the frame. This tank assembly consists of an elongated tank 56 having an inclined bottom portion or side 57 and a flat bottom portion 58. Located immediately above the flat bottom portion, approximately an inch, is the impeller assembly 59 of the solvent pump. This impeller is driven by the shaft 60 extending upwardly and connected to the motor 53. The impeller assembly 59 is directly connected to the conduit 61 leading upwardly through the top of the tank into the filter unit 52. The tank assembly 51 also includes a lint and button trap 62 which is removable by means of pulling up on the handle 63 for removing the lint and any buttons or debris. Leading into the tank 56 at the button trap 62 is a solvent drain conduit or hose 64 and overflow conduit, pipe or hose 65. Both of these hoses or conduits 64 and 65 cause the solvent flowing therethrough to first flow into the trap 62 through openings 64a and 65a and then downwardly into the tank. These openings 64a and 65a are located immediately above the inclined bottom portion of the tank so that the solvent flows downwardly on this inclined portion and circulates downwardly causing a flushing effect to continuously flush any material lying on the flat bottom portion 58 of the tank. This inclined side 57 also serves an additional purpose of maintaining the level of the solvent in the tank above impeller assembly 59 with a minimum amount of solvent. If the bottom of the tank 56 were entirely flat, a greater volume of solvent would be required to maintain the level of the solvent above the impeller assembly 59 and as a result the solvent would have to be replenished more frequently than is required by the tank 56.

A pump 66 is located in the solvent drain conduit 64 and is driven by the drain pump motor 67. An overflow valve 68 is located in the conduit 65. This valve which is actuated by a solenoid 69 comprises a valve housing 70 (FIG. 13) and a rotatably mounted valve element 71 mounted within the housing 70 on shaft 72 connected to the arm 73 of the solenoid 69. The arm 73 is biased in a counterclockwise direction by the spring 74 which in turn biases the valve element 71 closed against its annular seat 75 which has an O-ring 76 providing a seal for the valve element against the seat 75 to prevent the escape of any solvent or water through the valve.

The filter unit 52 is located immediately above the tank 56 and is connected to the tank by the conduit 61 previously described and the drain pipe 175 leading from the bottom of the filter unit to the tank. This drain pipe 175 is normally closed by the hand valve 176 and is only used for draining the filter unit for cleaning. The filter unit is a novel type filter which is described in more detail in my copending application Serial No. 832,652, filed August 10, 1959, and entitled, Filter for Home Dry Cleaner Apparatus. Briefly it consists of a housing 77 having a perforated filter bag support 78 supporting a fabric filter bag 79. This filter bag is held in place by the spring wire ring 80. The filter housing 77 has the opening 81, located above the bag 79, through which the solvent flows from the conduit 61. Below the filter bag 79 is the outlet opening 82 communicating with the conduit 83 which branches into a bypass or bypass conduit 84 and the input conduit 85. Bypass conduit 84 has a restrictor valve or restrictor valve assembly 86 provided for the purpose of controlling the flow of solvent through the bypass and input conduits 84 and 85 in response to the pressure in the filter unit.

Figure 14:
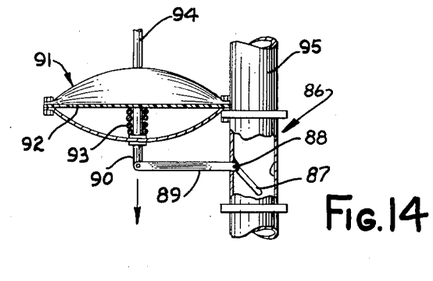
FIG. 14 is a schematic view of a pressure responsive valve utilized in the dry cleaning system.

FIG. 14 shows a schematic of this restrictor valve assembly 86 which includes the valve element 87 attached to the pivoted shaft 88 which is connected to the arm 89 extending downwardly and connected at its other end to the rod 90 which forms a part of the pressure responsive unit 91. This unit 91 includes the diaphragm 92 spring biased in one direction by the spring 93 on one side of the diaphragm tending to open the valve. The other side of the diaphragm 92 is subjected to the pressure in the top compartment of filter unit by means of the pressure line 94 communicating therewith. It should be readily obvious that as the pressure in the filter unit 52 increases the valve element 87 tends to close restricting the flow of solvent through the bypass. This arrangement is provided for the purpose of regulating the amount of solvent flowing through the input conduit 85 which will be described in more detail hereinafter under the heading "Operation." The input conduit 85 has a solenoid actuated shut-off valve 220 and a check valve for preventing the solvent or water from backing up into the filter unit.

Figure 9:
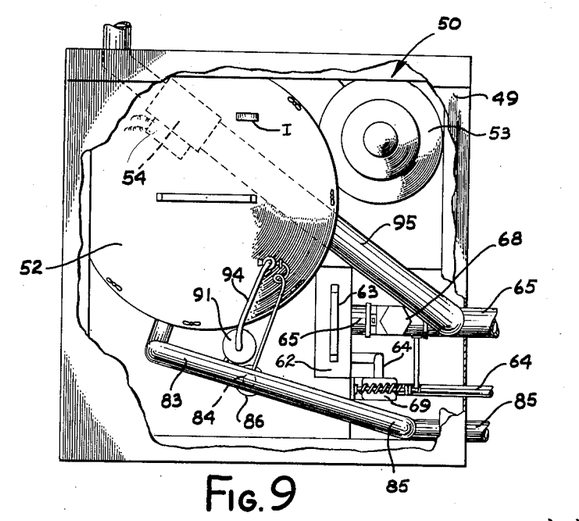
FIG. 9 is a cross sectional plan view taken along the plane IX—IX of FIG. 3.

The solvent intended for use in this apparatus contains perchloroethylene, the vapors of which are somewhat toxic and therefore must be exhausted to prevent excessive inhalation thereof. We provide a built-in venting means which includes the vent pipe or conduit 95 connected to the overflow conduit 65 immediately ahead of or upstream of the valve 68. This vent pipe extends upwardly and then at an angle toward the rear of the unit (FIG. 9) where there is located the vent fan 54. The vent pipe 95 then continues out of the rear of the machine and is intended for connection to a hose leading to the outside of the house.

Figure 3:
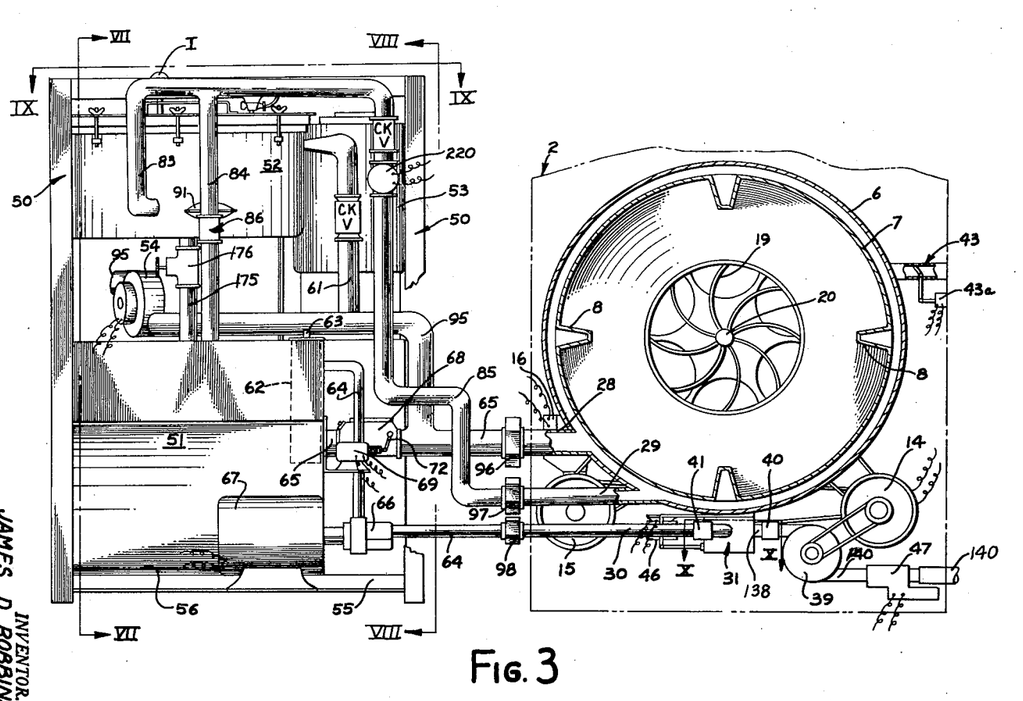
FIG. 3 is a side elevational, schematic view of the combination laundry and dry cleaning apparatus of FIG. 1 showing the basic component parts of the dry cleaning attachment unit and the combination washer-dryer unit.

We have thus far described the various components of both the combination washer-dryer unit 2 and the dry cleaning attachment 3. As shown in FIG. 3 these two units are connected together by the couplings 96, 97 and 98 (FIGS. 1 and 3). Coupling 96 connects the overflow conduits 28 and 65. Coupling 97 connects the input conduits 85 and 29. Coupling 98 connects the drain conduits 30 and 64. An electrical connector 48 also connects the electrical systems of the two units (FIG. 15), which systems will now be described.

*Electrical Control System for Combination Dry Cleaner-Washer-Dryer*

Figure 15:
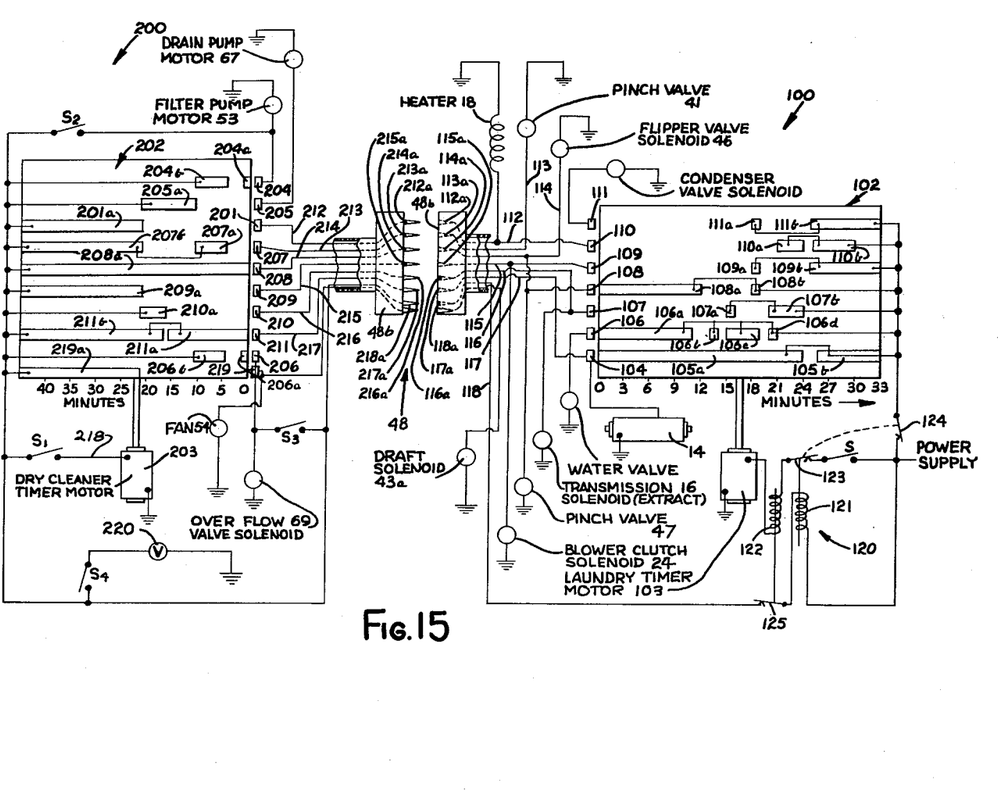
FIG. 15 is an electrical schematic diagram of the electrical control means for the apparatus of FIG. 1.

FIG. 15 shows the electrical control system for the combination dry cleaner-washer-dryer combination of FIGS. 1 and 3. This system is divided into two circuits, 100 and 200. The circuit 100 is the combination washer-dryer circuit and the circuit 200 is the dry cleaner attachment circuit. The circuit 100 will work independently of the circuit 101 but circuit 200 is directly dependent on the combination washer-dryer circuit 100. The two circuits are connected together by the electrical connector 48 including the female connector part 48a and male connector part 48b.

The combination washer-dryer circuit 100 consists of the timer or timing element or mechanism 102 driven by the laundry timer motor 103. The timer element 102 has a plurality of electrical contact segments arranged at predetermined positions so as to bring into action the various components of the system in the predetermined timed sequence. It should be understood that the timer element 102 is shown expanded and for purposes of illustration the minutes at which the various brushes engage the contact segments are shown at the lower edge of element 102. For example, the brush 104 connected to the motor 14 is shown as engaging the contact strips 105a and 105b during the entire time cycle except during the 25th minute. It will be noted that each of the contact segments are connected to a power supply line and the electrical components are each connected to one brush and to ground. This is shown for illustration purposes only since various different arrangements could be made without departing from the spirit of this invention.

Now referring to each of the electrical components, it will be seen that the water valve is electrically connected to the brush 106 which at predetermined time sequence engages the contact segments 106a, 106b, 106c and 106d. The transmission solenoid 16 which throws the transmission into extract speed is electrically connected to the brush 107 arranged to engage the contacts 107a and 107b. The pinch valve 40 is connected to the brush 108 and is adapted to engage the contact segments 108a and 108b. The blower clutch solenoid 24 is electrically connected to the brush 109 adapted to engage in a predetermined timed sequence the contact segments 109a and 109b. The heater 18 is electrically connected to the brush 110 arranged for engaging the contact segments 110a and 110b. The condenser valve solenoid is electrically connected to the brush 111 which in turn engages the contact segments 111a and 111b. It will be noted that the flipper valve solenoid 46 and the pinch valve 41 form a part of the circuit 100 although they are not connected to the timing element 102.

Connected to several of the components of the circuit 100 are the electrical lines leading to the female connector part 48a. These lines are lines 112 leading from the heater 18, 113 connected to the pinch valve 41, line 114 connected to the flipper valve solenoid 46, line 115 connected to the blower clutch solenoid 24, line 116 connected to the transmission solenoid 16, 117 extending from the motor 14 and 118 connected to the power supply. Each of these lines are in turn connected to the connector parts 112a, 113a, 114a, 115a, 116a, 117a and 118a, respectively.

It should be obvious from the above description that the circuit 100 is adapted for controlling the operation of the combination washer-dryer unit independently of the dry cleaning attachment circuit 200. A detailed description of the control operation of circuit 100 is not considered necessary. Briefly, the operation involves the closing of switch S which actuates the motor 14, the water valve, and the pinch valve 40 which causes the water to flow into the tank 6 to a predetermined level determined by a conventional level control device (not shown). During this time the basket 7 is tumbling at slow speed and for a matter of about 12 minutes the clothes in the machine are washed. The pump 39 (FIG. 3) is continuously operating but fails to drain any water because the pinch valve 40 is closed. After 12 minutes this pinch valve opens, the pump 39 drains the tank 6 and ultimately the basket 7 goes into spin by reason of the energization of the transmission solenoid 16. There are alternate spray rinses and spinning operations until the clothes are rinsed and the water is extracted therefrom. At this time, approximately at 21 minutes, the heater 18 is energized and eventually the blower clutch 23 is energized starting the blower or fan. During this time of the cycle the condenser valve solenoid is energized causing water to flow downwardly through the condenser water passageway 25a. This water is cold and as a result condenses the moisture from the air passing over this passageway. Eventually, the clothes are dry and the laundry operation is complete.

The dry cleaner attachment circuit 200 includes the timer element or mechanism 202 driven by the dry cleaner timer motor 203. This timing mechanism is very similar to the timing mechanism of the combination washer-dryer unit. The timer element 202 also has a plurality of contact segments arranged to be engaged by a plurality of brushes which are connected to the components of the dry cleaner attachment unit and also to several of the components of the combination washer-dryer unit.

Specifically, filter pump motor 53 is connected to the brush 204 adapted to engage the contact segments 204a and 204b. The drain pump motor 67 is connected to the brush 205 adapted to engage the contact segment 205a. The overflow valve solenoid 69 is connected to the brush 206 arranged to engage the contact segments 206a and 206b. Brush 201 is connected to line 212 leading to the prong 212a. Similarly, brush 207 is connected to the line 213 leading to the prong 213a. Brush 201 is arranged to engage the contact segment 201a and brush 207 is arranged to contact the contact segments 207a and 207b. Brush 208, which is adapted for engagement of contact segment 208a, is connected to the prong 214a by the line 214. Brush 209 arranged for engaging segment 209a is connected to the prong 215a by line 215. Brush 210 is aligned for engaging contact segment 210a and is connected to prong 216a by the line 216. Brush 211 is connected to line 217 which in turn is connected to prong 217a. This brush rides on the contact segments 211a and 211b. Brush 219 aligned for engagement with contact segment 219a is connected to fan 54 and draft solenoid 43a of circuit 100. Finally, line 218 is connected to the dry cleaner timer motor through the manual operated switch $S_1$. This line 218 terminates at the prong 218a.

As will be noted, the prongs 212a, 213a, 214a, etc. are adapted to be received by the socket parts 112a, 113a, 114a, etc., respectively. As a result, lines 212, 213, 214 are electrically connected to the lines 112, 113, 114, etc., when the connector parts 48a and 48b are plugged together. As a result, brush 205 is electrically connected to the heater 18, brush 207 to the pinch valve 41, brush 208 to the flipper valve solenoid 46, brush 209 to the blower clutch 23, brush 210 to the transmission solenoid 16, brush 211 to the motor 14, and dry cleaner timer motor to the Power Supply.

A safety switch assembly 120 for preventing the two timing mechanisms from operating simultaneously is provided. This assembly includes the solenoids 121 and 122 which when energized are adapted to open the contact breakers 123—124, and 125, respectively. Accordingly, when manual switch S is closed solenoid 122 is energized opening contact breakers 125. This prevents the dry cleaner timer motor 203 from operating and makes the timer element 202 ineffective since it is disconnected from the Power Source. When manual switch $S_1$ is closed solenoid 121 is energized opening contact breakers 123 and 124. This prevents operation of laundry timer motor 103 and makes timer element 102 ineffective since it is then disconnected from the power source.

It should be obvious from the above description of the circuit 200 that its timer mechanism controls the operation of several of the components of the combination washer-dryer unit. This operation cycle can best be understood from the following chart:

| Action | Description | Time Interval, Min. | Total Time Lapse, Min. |
|---|---|---|---|
| 1 | Flipper valve element 37 closes, Pinch Valve 40 closes. | 41 | Duration. |
| 2 | Filter pump motor 53 on, tumbling starts, overflow valve 68 opens. | 1 | 1 |
| 3 | Tumbling continues, overflow closes. | 3 | 4 |
| 4 | Tumbling continues, overflow valve 68 opens, filter pump motor 53 on. | 7 | 11 |
| 5 | Tumbling continues, Drain pump 66 on. | 5 | 16 |
| 6 | Drain pump 66 on. | 1 | 17 |
| 7 | Extraction (Spin). | 5 | 22 |
| 8 | Tumbling, heater 18 on, blower 19 on, fan 54 on, Draft open. | 19 | 41 |

Following this chart, it will be noted that upon initiation of the cycle brush 208 engages contact segment 208a which energizes the flipper valve solenoid causing the flipper valve element 37 to be actuated to the right as shown in FIG. 12 closing the conduit 38 and opening the conduit 30. Further, pinch valve 40 closes. This occurs during the entire dry cleaning cycle since it is imperative that no water be permitted to mix with the solvent, and it is naturally desirable to prevent the escape of the solvent through the water drain.

Also upon initiation of the cycle the filter pump motor 53 is actuated by brush 204 engaging the contact segment 204a; the basket 7 begins to tumble at a slow speed as the brush 211 engages the contact segment 211a; and the overflow valve 68 opens by reason of the brush 206 engaging the contact segment 206a. The duration of the actuation of the filter pump and the opening of the overflow valve is one minute after which the tumbling continues but the overflow valve closes.

At a total time lapse of 4 minutes, brush 206 engages contact segment 206b opening the overflow valve 68; filter pump motor 53 is actuated by the brush 204 engaging the contact segment 204b; and pinch valve 41 is closed as brush 207 engages segment 207a. The duration of this action is for 7 minutes after which the overflow valve closes, the filter pump stops, the pinch valve 41 opens. The drain pump motor 67 is energized at 11 minutes when the brush 205 engages the contact segment 205a. At the 16th minute the tumbling stops for one minute and the drain pump continues to drain the solvent from the tank 6. Ultimately on the 17th minute the brush 210 engages contact segment 210a energizing the transmission solenoid 16 and throwing the transmission into high extract or spin speed. This continues for five minutes during which time the solvent is extracted from the clothing by centrifugal force. After the 22nd minute brushes 201 and 209 engage the contact segments 201a and 209a, respectively, causing the heater 18 to be turned on and the blower clutch solenoid to be energized starting the blower or fan. This continues for the remainder of the cycle during which time the clothes are dried.

Included in the circuit 200 are the switches $S_2$, $S_3$ and $S_4$ all of which are actuated simultaneously by any conventional manual actuating means for shutting valves 220 and 68 and starting the filter pump motor 53. These switches are provided in order to circulate the solvent through the bypass, tank and filter thereby bypassing the laundry unit. This circulation is desirable in order to rejuvenate the filter after it has been cleaned which will be described in more detail hereinafter under "Operations."

*Modified Automatic Washer*

Figure 16:
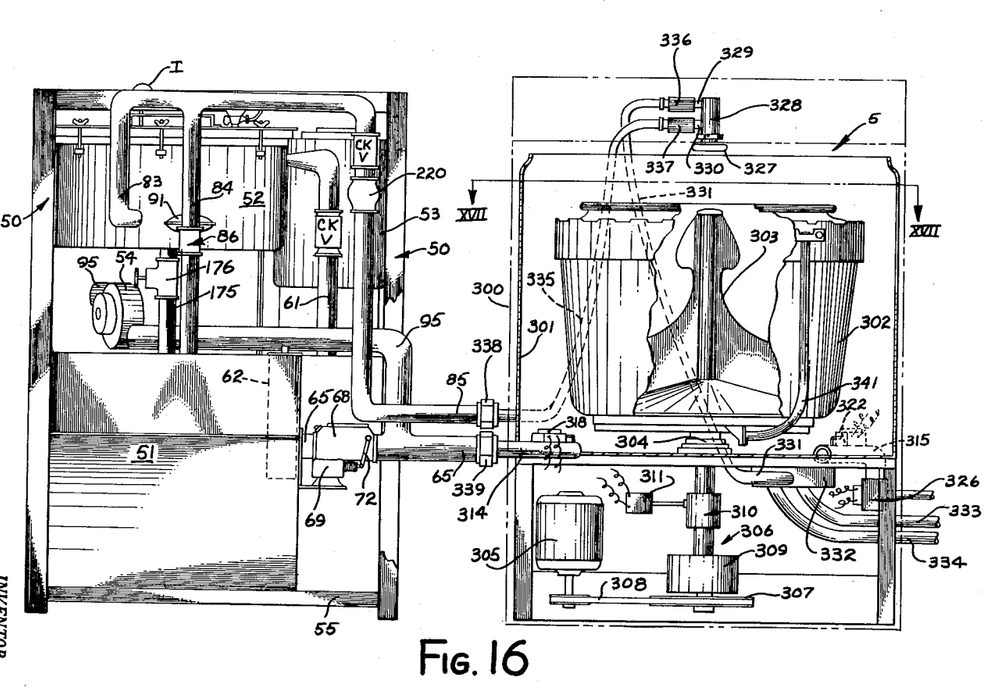
FIG. 16 is a front elevational, schematic view of the laundry and dry cleaning combination of FIG. 2 illustrating the basic components of the two units.
Figure 17:
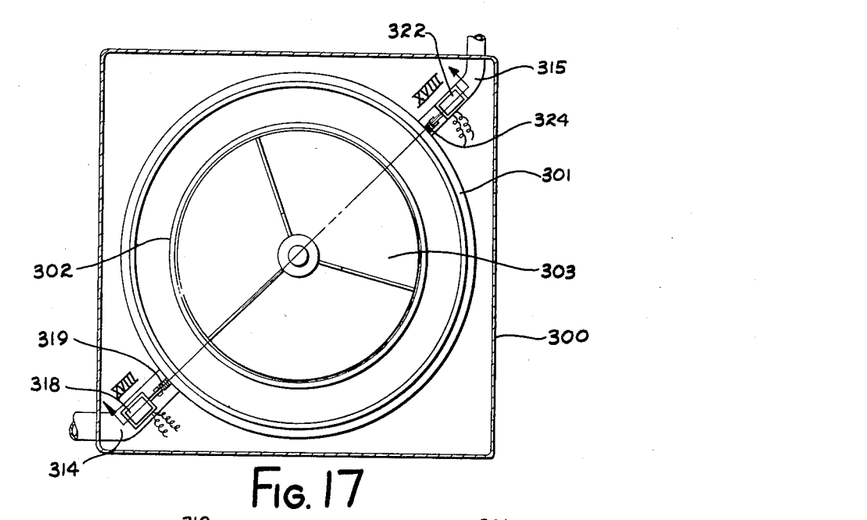
FIG. 17 is a cross sectional, schematic plan view taken along the plane XVII—XVII of FIG. 16.

The dry cleaning attachment unit 3 can be slightly modified to provide a unit 3a to be used with a conventional but modified automatic washer. The only changes to be made in this dry cleaner attachment unit is in the electrical control system. Further, the solvent drain pump can be eliminated if desired. FIG. 16 shows such a modified dry cleaning attachment unit 3a. It will be noted that the solvent drain pump has been completely eliminated and the solvent is drained from the tank solely by gravity. As will be described hereinafter in relation of FIGS. 22–25, the solvent drain pump can be utilized by merely changing the structure of the valve means for the solvent and water drain outlets.

FIGS. 16, 17, 18, 19 and 20 best illustrate the structure of the modified automatic washer 5. This modified automatic washer 5 includes a housing or casing 300 enclosing a tub or tank 301 in which is located the basket 302. An agitator 303 is located inside the basket 302 which is mounted for rotation on the bearing 304. Both the basket 302 and agitator 303 are driven by the motor 305 through the power drive mechanism 306.

The power drive mechanism 306 includes the pulley 307 driven through the belt 308 by the motor 305. The pulley is journalled in the bearing 309. Immediately above the bearing 309 is the clutch and brake assembly 310. This assembly includes the brake solenoid 311 which when energized releases the brake causing the entire basket 302 to be rotated or spun. When not energized, the solenoid 311 prevents rotation of basket 302 but permits actuation of the agitator 303. The motor 305 is arranged to operate at two speeds. At one slow or tumble speed the agitator 303 is actuated and at high or extraction speed the entire basket 302 is spun. This will be described in more detail in the description of the electrical control circuits.

The basket 302 has a tube or pipe 341 communicating with the bottom of the basket and extending upwardly toward the top. This tube is arranged in a conventional manner so that as the basket spins, the water by centrifugal force flows upwardly out of basket 302.

Figure 18:
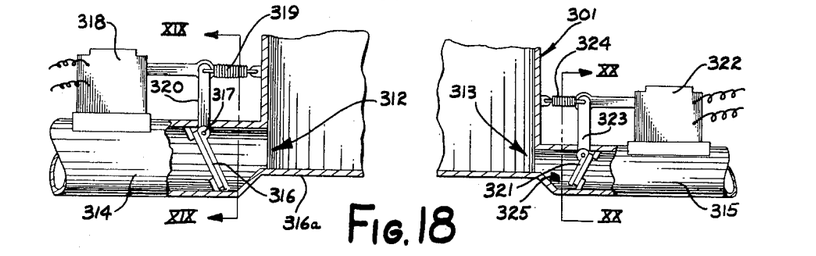
FIG. 18 is a partially sectioned fragmentary view of the valve means for the modified automatic washer. This view is taken along the plane XVIII—XVIII of FIG. 17.
Figure 19:
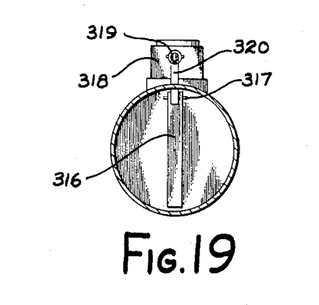
FIG. 19 is a cross sectional view taken along the plane XIX—XIX of FIG. 18.
Figure 20:
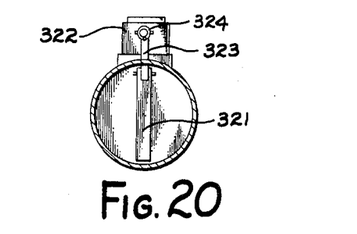
FIG. 20 is a cross sectional view taken along the plane XX—XX of FIG. 18.

At each side of the tank 301 are the openings 312 and 313 (FIG. 18). The opening 312 leads to the solvent drain pipe 314 and the opening 313 leads to the water drain pipe 315. These pipes are slightly offset downwardly from the bottom 316a of the tank 301 so that the water and solvent will be more completely drained from the tank.

In the solvent drain pipe 314 is located the valve element 316 pivotally mounted about the axis 317 and adapted to be opened by the solvent valve solenoid 318.

Figure 13:
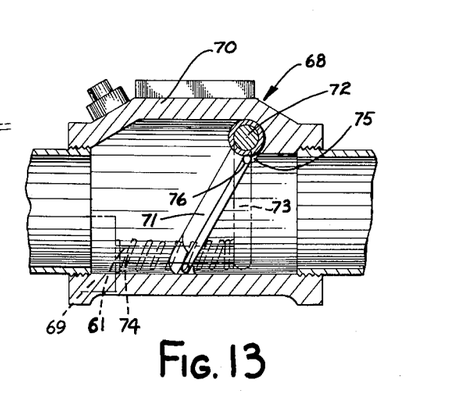
FIG. 13 is a cross sectional view of the valve in the overflow conduit of the dry cleaner attachment unit.

The valve element 316 is normally held closed by the spring 319 which biases the arm 320 in a clockwise direction as viewed from FIG. 13.

The drain pipe 315 has a pivotally mounted valve element 321 mounted therein for closing off communication between the tank and the water drain pipe 315. This valve element 321 is actuated by the solenoid 322 through the actuating arm 323. It is also biased in a closed position by the spring 324.

It will be noted that drain pipe 315 is offset only a very small distance below the bottom 316a of the tank and the valve element 321 is located as close to the tank as possible. This permits only a small portion of water to remain in the tank this portion being only that amount which would fill the space 325 located between the valve element 321 and the opening 313. It is important that this space will hold no more than 3½ ounces of water since any greater volume of water will be detrimental to the dry cleaning operation.

A drain pump 326 is also connected in the water drain pipe 315. It is provided for pumping water into the drain tank.

The water or solvent flows into the basket 302 through the flume 327 located immediately above the basket. Connected to this flume is the fitting 328 having the water inlet 329 and solvent inlet 330. Connected to the water inlet 329 is the water hose 331 leading to the mixer valve 332 into which the hot water hose 333 and cold water hose 334 is attached. The mixer valve 332 has two solenoids, one for the hot water and one for the cold water for controlling the temperature of the water flowing into the water inlet 329. Connected to the solvent inlet 330 is the solvent hose 335 which extends outwardly of the casing 330 for connection to the input conduit of the dry cleaning attachment unit. Check valves 336 and 337 are mounted in the water and solvent hoses, respectively. These check valves prevent the water from flowing into the hose 335 and the solvent from flowing into the hose 331.

Having described the modified automatic washer 5, it is evident from FIG. 11 that this unit is connected to the dry cleaning attachment unit 3a in substantially the same way as the combination washer-dryer unit 2 is connected to the dry cleaner attachment unit 3. The connecting of the two units together is very simple merely consisting of connecting the solvent hose 335 to the input conduit 85 by means of a coupling 338. The solvent drain pipe 314 is connected to the overflow drain conduit 65 by the coupling 339. The two electrical circuits of the two units are then connected together by the electrical connector 340. These circuits will now be described.

*Electrical Control Circuit for Combination Dry Cleaner-Washer*

Figure 21:
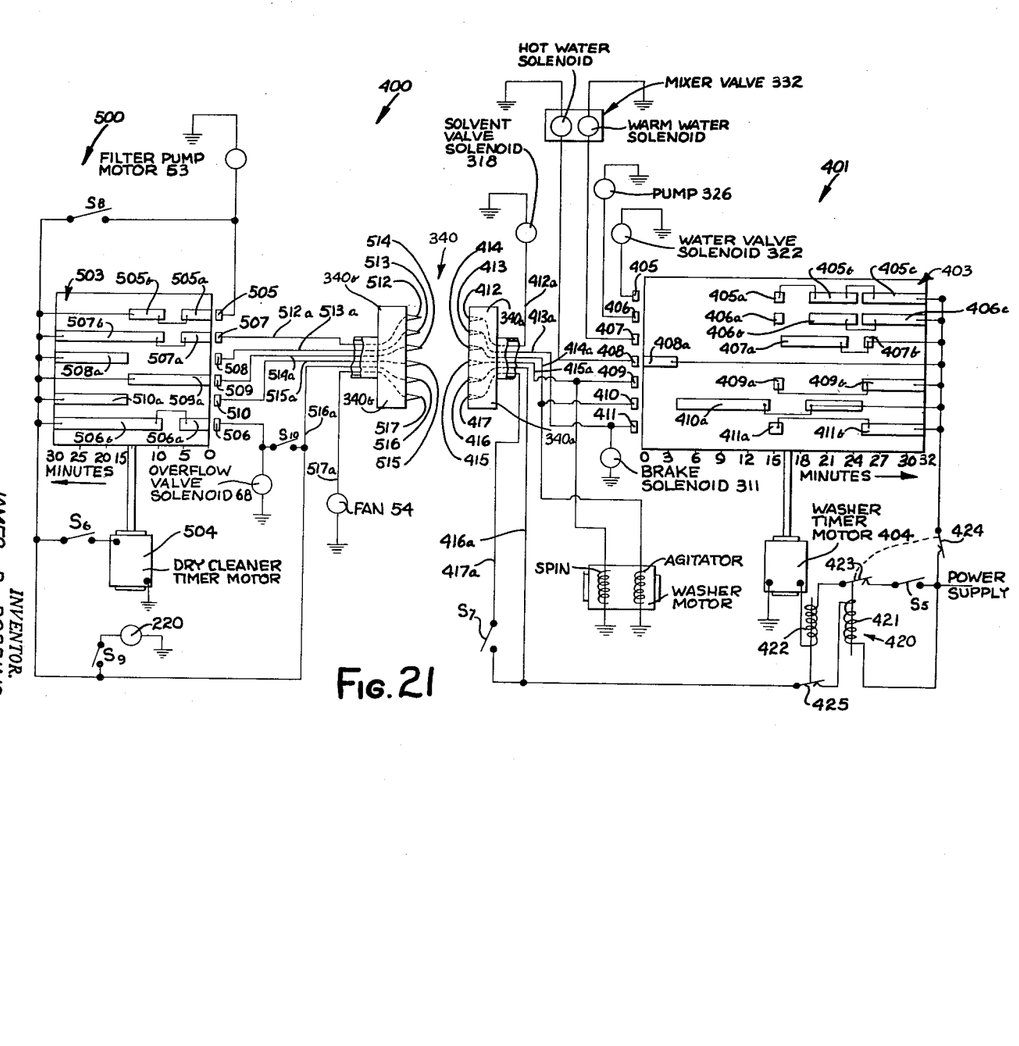
FIG. 21 is an electrical schematic diagram of the electrical control means for the apparatus of FIG. 2.

FIG. 21 shows the control circuit 400 for the combination dry cleaner-washer apparatus of FIG. 2. The control circuit 400 consists of two parts, the automatic washer circuit 401 and the dry cleaner attachment unit circuit 500. The automatic washer circuit 401 includes the timer element 403 having a plurality of contact segments arranged in predetermined positions for engagement by the brushes in timed sequence. This timer element 403 is driven by the washer timer motor 404. It will be noted that for purposes of illustration the time in minutes is marked along the lower edge of the timer element 403 to designate the time at which the various brushes will engage the contact segments.

Referring now to the various electrical components in the washer circuit 401, it will be noted that the water valve solenoid 322 is connected to the brush 405 adapted to engage the contact segments 405a, 405b and 405c. The pump 326 is connected to the brush 406 adapted to engage the contact segments 406a, 406b and 406c. The mixer valve has two solenoids; the warm water solenoid connected to the brush 407 which is arranged to the contact segments 407a and 407b, and the hot water solenoid connected to the brush 408 which engages the contact segment 408a.

As previously described, the washer drive mechanism has two speeds provided by means of a differential or by means of two fields for the motor. In order to illustrate this we show two motor fields, a spin field and an agitator field. The spin field is connected to the brush 409 adapted to engage the segments 409a and 409b. The agitator field is connected to the brush 410 arranged for engaging the contact segments 410a and 410b. The brake solenoid is connected to brush 411 aligned to engage the contact segments 411a and 411b.

This arrangement of the basic components is generally conventional and produces a washing cycle that is well known in the art. Therefore, a detailed explanation of the cycle is not considered to be necessary. Briefly, the cycle consists of starting the washer timer motor 404 by closing switch $S_5$ which first fills the basket 302 with hot water. Then the agitator is brought into operation for about 10 minutes. Next a wash, spin and spin rinse for about 1½ minutes occurs and then the tank is filled with warm water for about 4 minutes. During a part of this time and subsequent thereto the agitator agitates the clothes in the rinse water and also during this time the rinse water is running over the basket 302 and into the tank 301. During this time the pump is actuated and the water valve solenoid 322 opens the valve in the water drain pipe 315. Finally, the spin field is energized causing the basket 302 to spin causing extraction of the water by centrifugal force through pipe 341 during which time the pump is running and the water valve in the water drain pipe 315 is open. This damp dries the clothes.

It will be noted that the washer circuit 401 also includes the solvent valve solenoid 318.

Various components of the electrical circuit 401 are connected to the female connector part 340a. These include the solvent valve solenoid 318 connected to the socket 412 by the line 412a, the brake solenoid 311 connected to the socket 413 by the line 413a, the agitator field connected to the socket 414 by the line 414a, and the spin field connected to the socket 415 by the line 415a. The power supply is connected to the sockets 416 and 417 by the lines 416a and 417a, respectively.

The dry cleaner attachment circuit 500 includes the timer element 503 driven by the timer motor 504. The timer element 503 includes a plurality of contact segments arranged to be engaged by brushes in predetermined time sequence. Specifically, the filter pump motor 53 is connected to the brush 505 adapted for engaging the contact segments 505a and 505b. The overflow valve solenoid is connected to the brush 506 arranged to engage the contact segments 506a and 506b. Brush 507 adapted to engage the contact segments 507a and 507b is connected to the prong 512 by line 512a. Brush 508 arranged to engage the contact segment 508a is electrically connected to the prong 513 by the line 513a. Similarly brushes 509 and 510 are connected to the prongs 514 and 515 by the lines 514a and 515a, respectively. The dry cleaner timer motor 504 is connected to the prong 516 by the line 516a through the switch $S_6$, and fan 54 is connected to prong 517 by line 517a. It should be evident from the drawings and the above description that the brush 507 is electrically connected to the solvent valve solenoid 318, the brush 508 to the brake solenoid 311, the brush 509 to the agitator field, the brush 510 to the spin field, the dry cleaner timer motor 504 to the main power source, and fan 54 to the main power source through switch $S_7$. As a result, several of the components of the washer are controlled by the dry cleaner timer mechanism. This produces a cycle which can be best illustrated by the following graph.

| Action | Description | Time Interval | Total Time Lapse |
|---|---|---|---|
| 1 | Filter pump motor 53 starts; agitator is actuated, overflow valve 68 opens, valve element 316 opens. | 6 | 6 |
| 2 | Agitator continues, overflow valve 68 and valve element 316 closes. | 3 | 9 |
| 3 | Filter pump motor 53 agitator continues, overflow valve 68 opens, valve element 316 opens. | 7 | 16 |
| 4 | Brake solenoid releases brake, basket spins, valve element 316 remains open, overflow valve remains open. | 12 | 28 |

Briefly reviewing this graph it will be noted that upon initiation of the timing cycle the brushes 505, 506, 507, and 509 engage segments 505a, 506a, 507a, and 509a. This causes the filter pump to pump solvent through the filter and into the basket 302, the agitator begins to operate, and the overflow valve 68 and valve 318 to both open. When the basket is full of solvent the solvent overflows and returns to the tank by gravity. This continues for a period of about six minutes at which time the filter pump stops, and the two valves close. A sufficient time of 3 minutes is allowed for the clothing to be saturated with the solvent. At the total elapsed time of nine minutes the filter pump, the agitator 303 are operated while the valve 68 and valve element 316 are open for seven minutes. Finally, at the 16th minute the filter pump stops, the brake solenoid releases the brake, the basket begins to spin and the valve element 316 and valve 68 remain open whereby the solvent is extracted from the clothing. This continues for another 12 minutes after which the clothes are damp dry and ready for drying in a conventional dryer. When the top of the washer is opened the switch $S_7$ closes energizing fan 54 which draws fumes through the vent 95 outside the building in which the apparatus is located.

Circuit 500 also has the manually operated switches $S_8$, $S_9$ and $S_{10}$ which operate the filter pump and valves 220 and 68 independently of the timer mechanism. This is to permit circulation of the solvent entirely through the filter and bypass conduit 84.

A safety switch assembly 420 is provided for preventing the simultaneous operation of the timing mechanism. This assembly includes the solenoids 421 and 422 which when energized are adapted to open the contact breakers 423—424 and 425, respectively. Accordingly, when manual switch $S_5$ is closed solenoid 422 is energized opening contact breaker 425. This prevents the dry cleaner timer motor 504 from operating and makes the timer element 503 ineffective since it is disconnected from the Power Source. When manual switch $S_6$ is closed solenoid 421 is energized opening contact breakers 423 and 424. This prevents operation of the laundry timer motor 404 and makes the timer element 403 ineffective by disconnecting it from the power source.

*Operation*

The operation of the two apparatuses, 1 and 4 are quite similar. A major difference is that the apparatus 1 has an additional step of drying the clothing. Basically, each of these apparatuses are adapted so that the laundry unit can be sold separately at one time and at a later time the dry cleaning attachment unit can be purchased and attached directly to the laundry unit for converting the laundry unit into a combination dry cleaning-laundry unit. This is accomplished very simply merely by making several quick connections.

Thus far we have basically described the operation of these two apparatuses. However, it is believed necessary to broadly describe a complete operation. Therefore, the operation of the combination dry cleaner-washer apparatus 1 will first be described and in this description the specific operation of all the components of the dry cleaning attachment unit 3 will be given. Since the dry cleaning attachment unit 3a is substantially identical to the unit 3, it is believed that in the description of the apparatus 4, the reiteration of the specific operation of all the components of the dry cleaning attachment unit 3a is not essential and necessary.

As previously stated, the combination washer-dryer unit 2 can be purchased either separately or with the dry cleaning attachment unit 3. Assuming the combination washer-dryer unit 2 is purchased separately, this unit can be utilized as a conventional washer-dryer by merely plugging up the openings in the conduits 28, 29 and 30. The cycle of the combination washer-dryer unit involves first washing the clothes by introducing hot water, agitating the clothes in the sudsy hot water, extracting the water from the clothes, removing it from the tank 6 by means of the pump 39, introducing warm water and rinsing the clothes; draining the warm water; and extracting the water from the clothes by spinning the basket 7. Then the clothes are dried in the basket 7 by energizing the heater 18 and passing warm air over the clothes by the fan 19. The moist air is passed by the condenser passageway 25a causing water to be condensed and flow downwardly to the drain. This is the conventional washing-drying cycle of the Norge combination washer-dryer.

When the dry cleaning attachment unit 3 is purchased, it is very easily attached to the combination washer-dryer unit 2 by connecting the two parts of the electrical connector 48 and coupling the conduits 28—85, 29—65, and 30—64 by the couplings 96, 97 and 98, respectively. With solvent in the tank 56 and the filter having been properly conditioned for filtering, the apparatus is then ready for use as either a washer-dryer or a dry cleaner.

When ready for use the dry cleaner attachment unit is arranged such that the hand valve 176 in the drain pipe 175 between the filter and tank is closed, the restrictor valve 86 in the bypass conduit 84 is substantially fully open, the shut-off valve 220 in the input conduit 85 is open, and the overflow valve 68 is closed. The dry cleaning operation is initiated by closing the switch $S_1$ (FIG. 15). This energizes solenoid 46 closing the flipper valve element 37. The dry cleaner timer motor 203 is also started and at the same time solenoid 121 is energized opening the contact breakers 123 and 124 which completely makes the timer mechanism of circuit 100 ineffective. The dry cleaning operation follows the cycle previously set forth until the clothes are completely dry cleaned and dried.

During the initial cleaning portion of the dry cleaning cycle the impeller assembly 59 of the sump pump forces the solvent upwardly through the conduit 61 and into the filter unit 52 through the inlet opening 81. In the filter unit 52 the impurities of the solvent are filtered and absorbed and the clean solvent flows out of the filter unit through the outlet opening 82 and into the conduit 83. Part of the solvent flows through the bypass 84 and the remainder of the solvent flows through the input conduit 85 and into the tank 6.

It is highly desirable that the level of the solvent in the tank 6 be maintained at substantially the same level as the overflow conduit 28. This permits the dirt and other material floating on top of the solvent to be drained immediately from the tank 6 and pass into the dry cleaning tank 56 through the valve 68 which is open simultaneously with the running of the filter pump. In order to regulate the level of the solvent in the tank, we provide the pressure responsive restrictor valve 86 which is actuated by the pressure responsive unit 91 communicating with the top of the filter unit 52. At the start of the use of a newly conditioned filter, the flow through the filter is of a substantial volume which would normally raise the level of the solvent in the tank 6. The bypass 84 prevents this by bypassing a substantial portion of the solvent through the bypass conduit 84 and back into the tank 56.

Figure 7:
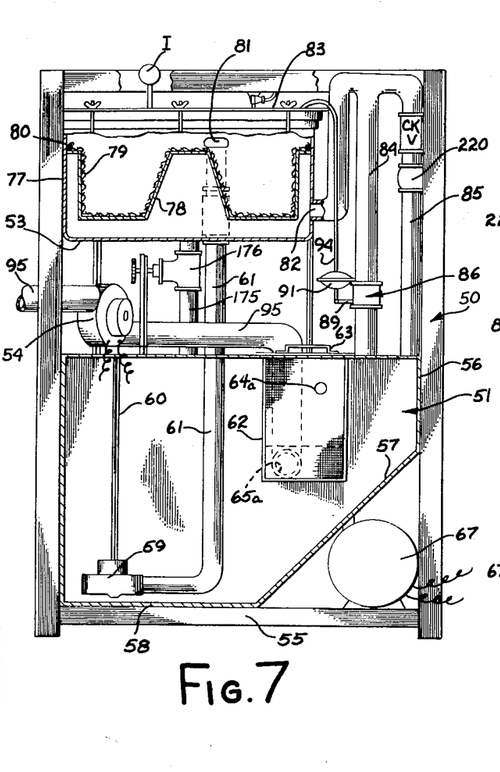
FIG. 7 is a cross-sectional, side elevational view taken along the plane VII—VII of FIG. 3.
Figure 8:
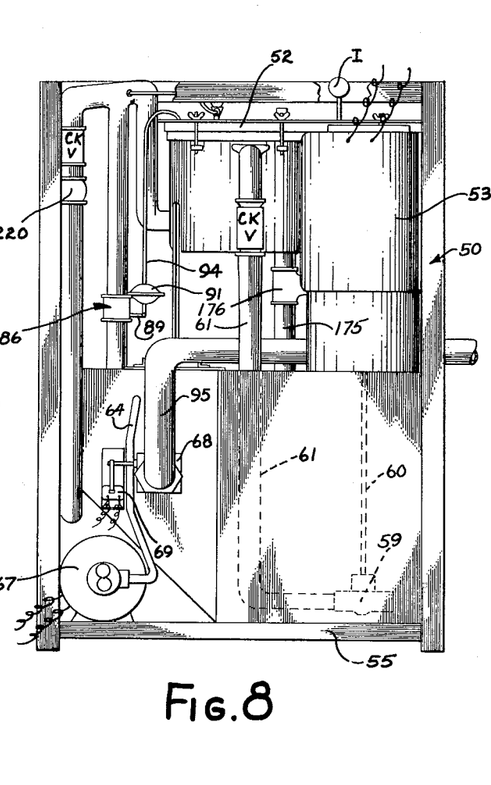
FIG. 8 is a cross sectional view taken along the plane VIII—VIII of FIG. 3.

We have also found that a minimum amount of solvent is required to be circulated through the cleaning tank if a good cleaning job is to be obtained. This desired flow rate for efficient cleaning is at least one gallon solvent per minute for each pound of garments being cleaned. After the filter unit has been used for some time without reconditioning, the flow of solvent through the filter unit starts to decrease. At the same time the pressure on the top compartment increases since the solvent forced into the top compartment is the same at all times. Therefore, the pressure on the diaphragm 92 (FIG. 14) increases causing the valve element 87 to move towards a closed position restricting the flow of solvent through the bypass 84. This permits a greater proportion of solvent to flow through the input conduit 85 and maintains the flow rate constant at all times. Finally, the pressure in the filter unit will increase to such an extent due to the clogging of the filter and a signal will be indicated on the indicator I (FIG. 7) which indicates to the user that the dry cleaning unit should no longer be used because it has lost its effectiveness.

The bypass 84 serves another purpose of permitting the filtering of a greater volume of solvent than is flowing through the tanks. This facilitates a cleaner solvent and as a result a more efficient dry-cleaning job.

As previously described as the solvent is circulated through the filter, the bypass, the overflow conduits 28 and 65, and tank 6 it flows downwardly against the inclined bottom portion 57 causing any sediment lying in the other flat portion 58 to be flushed preventing any accumulation of dirt or debris in the bottom of the tank 56. This is important because it substantially eliminates cleaning of tank 56 and as a result reduces the amount of service required on the dry cleaning attachment unit. The inclined bottom portion 57 also maintains the level of the solvent above the impeller assembly 59 with the minimum amount of solvent. Consequently, a greater loss of solvent by evaporation is permitted before replenishment is required.

The vent conduit 95 provides a means of exhausting vapors from the tank 6. This is particularly evident during the drying cycle when the fan 54 is operated for drawing vapors from the tank 6. This provides a built-in venting means for use on any laundry equipment that does not have any such venting means. During the operation of the fan 54 the draft valve 43 is opened by the solenoid 43a permitting a better exhaust of the solvent vapors from the tank 6.

When the filter unit 52 has lost its effectiveness the valve 176 is opened permitting the solvent to drain from filter unit 52 into tank 56. Then valve 176 is closed and filter bag or element 79 is removed, cleaned, and replaced all of which is described in more detail in my copending application Serial No. 832,652, filed August 10, 1960 and entitled, Filter for Home Dry Cleaner Apparatus. A filter aid such as diatomaceous earth and activated carbon is dropped into the solvent in tank 56 and then switches $S_2$ and $S_4$ are closed causing the filter pump motor 53 to operate and valve 220 to close. This causes the solvent to be circulated from tank 56, through filter unit 52, bypass conduit 84 and back into the tank for reconditioning the filter unit. Switches $S_2$ and $S_4$ are opened after the conditioning of the filter unit.

Having described the operation of the apparatus of FIG. 1, the operation of the dry cleaner-washer apparatus of FIG. 2 should be easily undersstandable. As noted, the major difference is the elimination of the drying portion of the cycle. Further, the solvent drain pump is eliminated by providing a gravity drain directly from the bottom of the tub 301 (FIG. 18) into tank 56.

It should be emphasized that the automatic washer unit 5 can also be sold separately and used solely as an automatic washer. The dry cleaning attachment unit 3a is attached by simply connecting the two parts 340a and 340b of the electrical connector 340 and connecting the conduits 85—335 and 65—314 by the couplings 338 and 339, respectively. When so connected the washer can still be used as a washer unit by closing the switch S₅ (FIG. 21). This sets the washing cycle into operation as previously described. It also energizes solenoid 422 opening the contact breaker 425 and preventing the circuit 500 from being effective.

When it is desired to use the apparatus 4 as a dry cleaner the switch S₆ is closed. This starts the dry cleaner timer motor 504 and also energizes solenoid 421 which opens the contact breakers 423 and 424 making the washer timer mechanism ineffective. Upon closing this switch S₆ and actuating the dry cleaner timer motor 504 the dry cleaning operation begins and follows the cycle previously set forth. During this dry cleaning cycle the components of the dry cleaning attachment unit 3a operate exactly like that described above with relation to the dry cleaner-washer-dryer apparatus 1 of FIG. 1. Briefly, the filter pump motor begins to operate and the valve element 316 and valve 68 open. This circulates solvent through the filter unit 52, conduits 83 and 85 and fills basket 302. After which the solvent overflows into the tank 301 and out through solvent drain pipe into tank 56. After the basket 302 is full and overflowing, the filter pump stops and the valve 68 and valve element 316 close permitting the clothes to be saturated by the solvent. Then filter pump again begins operating and the valve 69 and valve element 316 open causing circulation of the solvent during the dry cleaning portion of the cycle. Eventually, basket 302 goes into spin or extract speed causing the solvent to empty from the basket and the solvent to be extracted from the clothing. Upon completion of the dry cleaning cycle and when the top of the washer is opened the switch S₇ (FIG. 21) closes causing the fan 54 to operate and exhaust any fumes from the tank 301. This exhaust means created by the fan 54 through the vent conduit 95 is highly effective since the vapors are extremely heavy and fall to the bottom of the tank where conduit 65 is connected.

It should be readily evident from FIGS. 15 and 21 that we have provided an electrical control circuit for the dry cleaner attachment unit which can readily be plugged into the laundry units' circuits. The two circuits for each apparatus, that is, the combination washer-dryer circuit 100 and the dry cleaning attachment circuit 200 and the washer circuit 401 and dry cleaning attachment circuit 500, use several of the same electrical components to control the operation of the apparatuses.

It should also be evident that we have provided a valve means by which the conventional laundry machine is converted to a combination laundry-dry cleaner apparatus. This valve means is especially built to prevent any excessive water from accumulating in any crevices or other places for mixing with the solvent which would be highly detrimental to an effective dry cleaning operation.

*Modifications*

Figure 22:
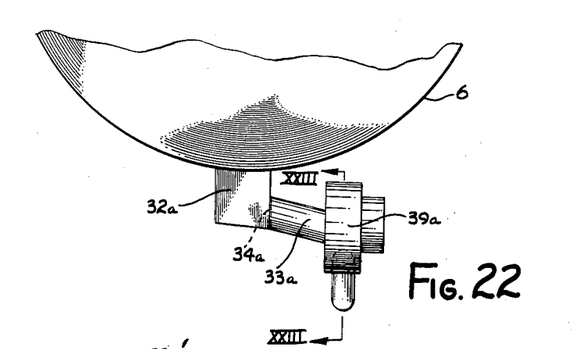
FIG. 22 is a schematic view of a modified valve means for either of the apparatuses shown in FIGS. 1 and 2.
Figure 23:
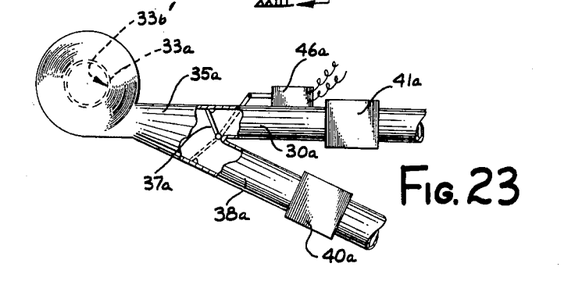
FIG. 23 is a partially sectioned view taken along the plane XXIII—XXIII of FIG. 22.

FIGS. 22, 23, 24 and 25 show various modifications of the valve means for draining the solvent and water. These modifications can be applied either to the combination dry cleaner-washer-dryer apparatus 1 or the combination dry cleaner-washer apparatus 4. For purpose of illustration, these will be described as pertaining to the combination dry cleaner-dryer-washer apparatus. FIGS. 22 and 23 disclose the tank 6 having the sediment trap 32a located in its bottom in place of the housing 32 of the unit previously described. Leading from the sediment trap 32a is the drain passageway 33a on the end of which is the pump 39a. Between the passageway 33a and the sediment trap 32a is the screen 34a. The pump 39a is arranged with its outlet or outlet conduit 35a below the inlet 33b which communicates with the drain passageway 33a. The outlet conduit 35a branches into two conduits 30a and 38a. At the juncture of these conduits 30a and 38a is the flipper valve 37a actuated by a solenoid 46a. It will be noted that the water drain conduit 38a is inclined downwardly from the pump. This is important in order that the water will drain downwardly by gravity and leave the least amount of water present in the tank 6 or sediment trap 32a to prevent excess amounts of water from mixing with the solvent. Located in the two conduits 30a and 38a are the pinch valves 41a and 40a, respectively.

Considering the above description of the entire apparatus and its operation, it should be evident that the water or solvent flows downwardly into the sediment trap 32a through the drain passageway 33a and into the pump. The pump runs constantly and, therefore, is pumping the water or solvent into the drain conduits 38a and 30a, respectively. The flipper valve 37a, which is actuated by the solenoid 46a, is operated in conjunction with the other apparatus in the same manner as the flipper valve element 37 and solenoid 46, previously described. The pinch valves 40a and 41a prevent backflow of the solvent or water and are operated in timed sequence the same as pinch valves 40 and 41, previously described.

In this modification of FIGS. 22 and 23 the solvent drain conduit 30a is connected directly to the conduit 64 of the dry cleaner attachment unit (FIG. 3) and the solvent drain pump 66 can be eliminated.

Figures 24, 25:
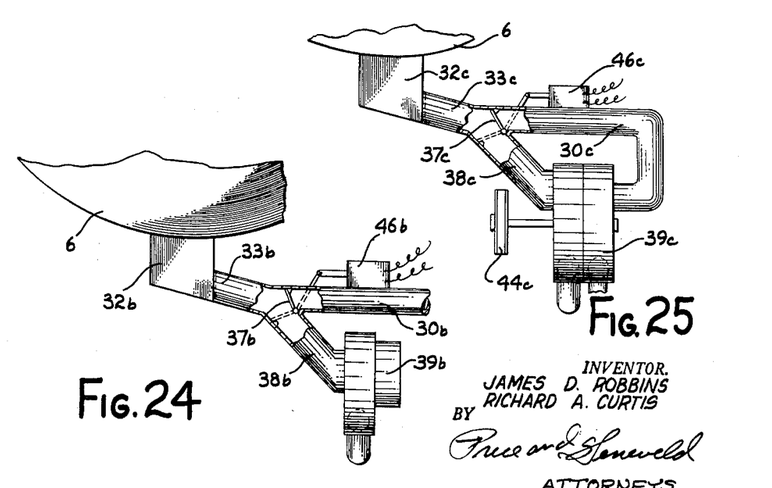
FIG. 24 is a partially sectioned view of another modified valve means for either of the apparatuses of FIGS. 1 and 2.
FIG. 25 is still another modified valve means for either of the apparatuses of FIG. 1 or 2.

FIG. 24 shows another arrangement which includes the sediment trap 32b from which the drain passageway 33b extends. In this modification the passageway 33b branches into the solvent drain conduit 30b and the water drain conduit 38b. The flipper valve 37b actuated by the solenoid 46b is adapted for controlling the flow of the fluid into either the conduit 30b or conduit 38b. In this case conduit 30b leads to the solvent pump exactly like that described above with relation to the solvent drain conduit 30 of FIG. 3. The water drain conduit 38b leads to the pump 39b. It will be noted that both the drain passageway 33b and water drain conduit 38b are inclined at an angle downwardly from the sediment trap 32b. This is to assure that the water in the tank 6 will flow downwardly leaving the minimum amount in the tank and preventing any excess water from mixing with the solvent.

FIG. 25 shows still another modification in which a single pump 39c is utilized, and the valve structure is quite similar to that described in FIG. 22. In this modification, the solvent drain pump 66 of FIG. 3 can be eliminated since the pump 39c is a two impeller pump which pumps both water and solvent by means of a single pulley 44c driven by a motor such as motor 14 of FIG. 3. In this modification the sediment trap 32c is mounted in the bottom of the tank 6 and has the passageway 33c extending therefrom at an angle inclined downwardly. This passageway 33c branches into the solvent conduit 30c and the water conduit 38c at the juncture of which is the valve 37c. This valve is actuated by the solenoid 46c. In this particular modification the liquid flows downwardly and depending upon the position of the flipper valve 37c flows through the solvent drain 30c to the solvent impeller side of the pump 39c or it flows downwardly through the water drain conduit 38c to the water impeller side of the pump 39c.

Having described our invention, it should become obvious that although we have shown and described a preferred form of it in detail, various modifications and alterations could be made without departing from the scope of the invention. Accordingly, the protection afforded this invention should be limited only as set forth by the appended claims.

We claim:

1. A dry cleaning apparatus comprising a washing tank for containing a fluid cleaning medium, means for agitating clothes in the fluid cleaning medium in said washing tank, an inlet means for flowing a fluid cleaning medium into said washing tank, an outlet means for discharging a fluid cleaning medium from said washing tank, said inlet means and outlet means being arranged to provide an overflow system whereby the fluid cleaning medium flows into said washing tank through said inlet means and at a predetermined level in said washing tank discharges from said washing tank through said outlet means; a fluid cleaning medium storage tank having an inlet communicating with said outlet means; a filter unit communicating with said storage tank and with said inlet means; pump means for circulating a fluid cleaning medium from said storage tank through said filter and said inlet means, into said washing tank, through said outlet means and back into said storage tank; and a bypass conduit connected between said inlet means and said storage tank for causing fluid cleaning medium to flow therethrough to said storage tank from said filter unit thereby by-passing said washing tank; a regulated restrictor valve in said bypass conduit; and means for regulating the restrictor valve in response to the pressure in the filter unit thereby regulating the flow of fluid cleaning medium into and through said washing tank.

2. A dry cleaning apparatus comprising a washing tank for containing a fluid cleaning medium, means for agitating clothes in the fluid cleaning medium in said washing tank, an inlet means for flowing a fluid cleaning medium into said washing tank, an outlet means for discharging a fluid cleaning medium from said washing tank, said inlet means and outlet means being arranged to provide an overflow system whereby the fluid cleaning medium flows into said washing tank through said inlet means and at a predetermined level in said washing tank discharges from said washing tank through said outlet means; a fluid cleaning medium storage tank having an inlet communicating with said outlet means; a filter unit communicating with said storage tank and with said inlet means; means for circulating a fluid cleaning medium from said storage tank through said filter and said inlet means, into said washing tank, through said outlet means and back into said storage tank; and means responsive to the pressure in said filter unit for regulating the flow of fluid cleaning medium through said washing tank.

3. A dry cleaning apparatus comprising a washing tank for containing a fluid cleaning medium, means for agitating clothes in the fluid cleaning medium in said washing tank, an inlet means for flowing a fluid cleaning medium into said washing tank, an outlet means for discharging a fluid cleaning medium from said washing tank, said inlet means and outlet means being arranged to provide an overflow system whereby the fluid cleaning medium flows into said washing tank through said inlet means and at a predetermined level in said washing tank discharges from said washing tank through said outlet means; a fluid cleaning medium storage tank having an inlet communicating with said outlet means; a filter unit communicating with said storage tank and with said inlet means; pump means for circulating a fluid cleaning medium from said storage tank through said filter and said inlet means, into said washing tank, through said outlet means and back into said storage tank; and a bypass conduit between said inlet means and said storage tank for causing fluid cleaning medium to flow therethrough to said storage tank from said filter unit thereby by-passing said washing tank; a regulated restrictor valve in said bypass conduit; and means for regulating the restrictor valve in response to the pressure in the filter unit thereby regulating the flow of fluid cleaning medium into and through said washing tank; said pump means, regulated restrictor valve, and outlet means being arranged and operatively associated to maintain the level of said fluid cleaning medium at the level of said outlet means.

4. A dry cleaning apparatus comprising a washing tank for containing a fluid cleaning medium, means for agitating clothes in the fluid cleaning medium in said washing tank, an inlet means for flowing a fluid cleaning medium into said washing tank, an outlet means for discharging a fluid cleaning medium from said washing tank, said inlet means and outlet means being arranged to provide an overflow system whereby the fluid cleaning medium flows into said washing tank through said inlet means and at a predetermined level in said washing tank discharges from said washing tank through said outlet means; a fluid cleaning medium storage tank having an inlet communicating with said outlet means; a filter unit communicating with said storage tank and with said inlet means; means for recirculating a fluid cleaning medium from said storage tank through said filter and said inlet means, into said washing tank, through said outlet means and back into said storage tank; and means responsive to the pressure in said filter unit for regulating the flow of fluid cleaning medium through said washing tank; said means for circulating, means for regulating the flow of fluid cleaning medium and outlet means being operatively associated and arranged to maintain the level of the fluid cleaning medium at the level of said outlet means.

References Cited in the file of this patent
UNITED STATES PATENTS

| | | |
|---|---|---|
| 2,019,011 | Johnson | Oct. 29, 1935 |
| 2,307,254 | Bassett | Jan. 5, 1943 |
| 2,359,138 | Martin | Sept. 26, 1944 |
| 2,630,694 | Creswick | Mar. 10, 1953 |
| 2,681,556 | Creighton et al. | June 22, 1954 |
| 2,759,346 | Beduhn | Aug. 21, 1956 |